(12) United States Patent
Wang et al.

(10) Patent No.: US 11,704,944 B2
(45) Date of Patent: Jul. 18, 2023

(54) AUTOMOBILE DIAGNOSIS INSTRUMENT, METHOD FOR RUNNING SYSTEM OF AUTOMOBILE DIAGNOSIS INSTRUMENT AND AUTOMOBILE DIAGNOSIS SYSTEM

(71) Applicant: AUTEL INTELLIGENT TECHNOLOGY CORP., LTD., Guangdong (CN)

(72) Inventors: Weilin Wang, Guangdong (CN); Ye Liao, Guangdong (CN)

(73) Assignee: AUTEL INTELLIGENT TECHNOLOGY CORP., LTD., Guangdong (CN)

(*) Notice: Subject to any disclaimer, the term of this patent is extended or adjusted under 35 U.S.C. 154(b) by 439 days.

(21) Appl. No.: 16/932,079

(22) Filed: Jul. 17, 2020

(65) Prior Publication Data

US 2020/0364957 A1    Nov. 19, 2020

Related U.S. Application Data

(63) Continuation of application No. PCT/CN2019/071057, filed on Jan. 10, 2019.

(30) Foreign Application Priority Data

Jan. 19, 2018  (CN) .......................... 2018100532463

(51) Int. Cl.
*G06F 13/40* (2006.01)
*G06F 13/42* (2006.01)
(Continued)

(52) U.S. Cl.
CPC ....... *G07C 5/0808* (2013.01); *G06F 13/4022* (2013.01); *G06F 13/4282* (2013.01);
(Continued)

(58) Field of Classification Search
CPC .. G07C 5/0808; G07C 5/008; G07C 2205/02; H04W 4/48; G06F 13/4022;
(Continued)

(56) References Cited

U.S. PATENT DOCUMENTS

2005/0065678 A1* 3/2005 Smith .................... G06Q 10/00
 701/1
2007/0069947 A1* 3/2007 Banet ..................... G07C 5/008
 455/552.1
(Continued)

FOREIGN PATENT DOCUMENTS

CN    102647317 A    8/2012
CN    103034194 A    4/2013
(Continued)

OTHER PUBLICATIONS

First Chinese Office Action dated Apr. 19, 2019; Appln. No. 201810053246.3.
(Continued)

*Primary Examiner* — Henry Tsai
*Assistant Examiner* — Harry Z Wang (57) ABSTRACT

The present application discloses a display panel and a display device. The display panel includes: a common electrode layer including a plurality of columns of first common electrodes, wherein each column of the plurality of columns of the first common electrodes includes a plurality of touch electrodes insulated from each other; and a driving module. Each of the plurality of touch electrodes is electrically connected to the driving module through one or more touch leads. A number of the touch leads corresponding to each of or adjacent ones of the plurality of touch electrodes gradually increases along a direction away from the driving module.

13 Claims, 6 Drawing Sheets

(51) Int. Cl.
*H04W 4/48* (2018.01)
*G07C 5/08* (2006.01)
*G07C 5/00* (2006.01)

(52) U.S. Cl.
CPC .............. *G07C 5/008* (2013.01); *H04W 4/48* (2018.02); *G06F 2213/0026* (2013.01); *G06F 2213/0042* (2013.01); *G07C 2205/02* (2013.01)

(58) Field of Classification Search
CPC ......... G06F 13/4282; G06F 2213/0026; G06F 2213/0042
See application file for complete search history.

(56) References Cited

U.S. PATENT DOCUMENTS

| | | | | |
|---|---|---|---|---|
| 2008/0015748 | A1* | 1/2008 | Nagy | G07C 5/008 701/31.4 |
| 2010/0265091 | A1* | 10/2010 | Zuniga | G01S 5/0269 340/8.1 |
| 2012/0277949 | A1* | 11/2012 | Ghimire | G07C 5/008 701/31.7 |
| 2015/0032607 | A1* | 1/2015 | Chen | G06Q 10/083 701/31.5 |
| 2016/0035156 | A1 | 2/2016 | Andrus | |
| 2016/0073275 | A1* | 3/2016 | Inoue | H04W 24/04 455/41.2 |

FOREIGN PATENT DOCUMENTS

| | | |
|---|---|---|
| CN | 103412832 A | 11/2013 |
| CN | 203338090 U | 12/2013 |
| CN | 103576668 A | 2/2014 |
| CN | 103645729 A | 3/2014 |
| CN | 103677921 A | 3/2014 |
| CN | 103901871 A | 7/2014 |
| CN | 103902389 A | 7/2014 |
| CN | 103917931 A | 7/2014 |
| CN | 204331463 U | 5/2015 |
| CN | 104932480 A | 9/2015 |
| CN | 105242917 A | 1/2016 |
| CN | 205123757 U | 3/2016 |
| CN | 105867352 A | 8/2016 |
| CN | 205485604 U | 8/2016 |
| CN | 206292954 U | 6/2017 |
| CN | 107566129 A | 1/2018 |
| CN | 108227680 A | 6/2018 |
| WO | 2016/020914 A1 | 2/2016 |

OTHER PUBLICATIONS

Second Chinese Office Action dated Jan. 7, 2020; Appln. No. 201810053246.3.
International Search Report dated Apr. 12, 2019; PCT/CN2019/071057.

* cited by examiner

The processor runs modules respectively corresponding to the first WiFi unit and the second WiFi unit in the system of the automobile diagnosis instrument, to control the first WiFi unit to be connected to a server and control the second WiFi unit to be connected to a lower computer — S101

AUTOMOBILE DIAGNOSIS INSTRUMENT, METHOD FOR RUNNING SYSTEM OF AUTOMOBILE DIAGNOSIS INSTRUMENT AND AUTOMOBILE DIAGNOSIS SYSTEM

This application is a continuation application of International Application No. PCT/CN2019/071057, filed on Jan. 10, 2019, which claims priority of Chinese Patent Application No. 201810053246.3, filed on Jan. 19, 2018, which is incorporated herein by reference in its entirety.

BACKGROUND

Technical Field

The present application relates to vehicle diagnostic technologies, and in particular, to an automobile diagnosis instrument, a method for running a system of the automobile diagnosis instrument and an automobile diagnosis system.

Related Art

With rapid development of automobile electronic technologies, functions of a vehicle become increasingly complex. Laws and rules raise increasingly restrict requirements on security, environment protection and energy conservation. Customer requirements on comfort, flexibility and individualization are greatly different. As a result, a development period of automobiles is shortened constantly. A large quantity of electronic controllers are widely used in automobiles, causing a huge challenge on vehicle diagnosis.

Automobile fault diagnosis is a process of identifying a performance failure of an automobile, testing related components and finding out a fault point. An automobile diagnosis device may communicate with a vehicle, thereby implementing diagnosis of the vehicle.

Currently, as a functional requirement of the automobile diagnosis device increases, how to implement a connection between the automobile diagnosis device and a server when the automobile diagnosis device is connected to the vehicle becomes a subject that is actively studied by a person skilled in the art.

SUMMARY

Embodiments of the present invention provide an automobile diagnosis instrument, a method for running a system of the automobile diagnosis instrument and an automobile diagnosis system, to resolve a problem that a diagnosis failure is caused because an existing automobile diagnosis instrument cannot be simultaneously connected to a vehicle and a server.

According to a first aspect, an embodiment of the present invention provides an automobile diagnosis instrument, including: a processor, and a first wireless fidelity (WiFi) unit and a second WiFi unit that are respectively connected to the processor.

The processor is configured to control the first WiFi unit to be connected to a server and control the second WiFi unit to be connected to a lower computer by using a system of the automobile diagnosis instrument.

The system of the automobile diagnosis instrument includes a driving layer, a service layer and a framework layer. The driving layer, the service layer and the framework layer each include modules respectively corresponding to the first WiFi unit and the second WiFi unit.

According to a second aspect, an embodiment of the present invention provides a method for running a system of an automobile diagnosis instrument. The method is applied to an automobile diagnosis instrument. The automobile diagnosis instrument includes: a processor, and a first WiFi unit and a second WiFi unit that are respectively connected to the processor. The method includes:

running, by the processor, modules respectively corresponding to the first WiFi unit and the second WiFi unit in the system of the automobile diagnosis instrument, to control the first WiFi unit to be connected to a server, and control the second WiFi unit to be connected to a lower computer.

According to a third aspect, an embodiment of the present invention further provides an automobile diagnosis system, including: a server, the automobile diagnosis instrument according to the first aspect, a lower computer and an automobile.

The automobile diagnosis instrument is connected to the server by using a first WiFi unit, the automobile diagnosis instrument is connected to the lower computer by using a second WiFi unit, and the lower computer is connected to the automobile.

In the automobile diagnosis instrument, the method for running a system of the automobile diagnosis instrument and the automobile diagnosis system provided in the embodiments of the present invention, the processor as well as the first WiFi unit and the second WiFi unit that are respectively connected to the processor are disposed. The processor controls the first WiFi unit to be connected to the server, and controls the second WiFi unit to be connected to the lower computer. That is, the automobile diagnosis instrument in the embodiment is communicatively connected to the server and the lower computer respectively.

REFERENCE NUMERALS

100: Automobile diagnosis instrument;
200: Server;
300: Lower computer;
110: Processor;
120: First WiFi unit;
130: Second WiFi unit;
140: RAM;
150: PMU;
160: NAND; and
400: Automobile.

DETAILED DESCRIPTION

To make the objectives, technical solutions, and advantages of embodiments of the present invention more comprehensible, the technical solutions according to the embodiments of the present invention are clearly and completely described in the following with reference to the accompanying drawings of the embodiments of the present invention. Apparently, the embodiments in the following description are merely some rather than all of the embodiments of the present invention. All other embodiments obtained by a person of ordinary skill in the art based on the embodiments of the present invention without creative efforts shall fall within the protection scope of the present invention.

First, related concepts in the present application are described as follows:

WiFi (wireless fidelity): A wireless communication protocol and standard for constructing a wireless local area network.

STA (station): A device that accesses a mobile access point and that works in a slave mode in a WiFi technology.

AP (access point): A mobile network access point, which is a device that works in a master mode in a WiFi technology.

Lower computer: A communication device that is connected to an automobile, where an automobile diagnosis device is communicatively connected to a vehicle by using the lower computer, and the lower computer may be a vehicle communication interface (VCI).

Automobile diagnosis instrument: A terminal that carries a diagnosis operating system, which may be a user terminal having a diagnosis function, such as a smart phone, or may be a specific diagnosis device.

PCIE (peripheral component interface express): A computer bus standard and interface.

SDIO (secure digital input and output card): A computer bus standard and interface.

Supplicant: A WiFi management and service program.

Android: An operating system that is issued by Google and that is used in a mobile terminal.

Figure 1:
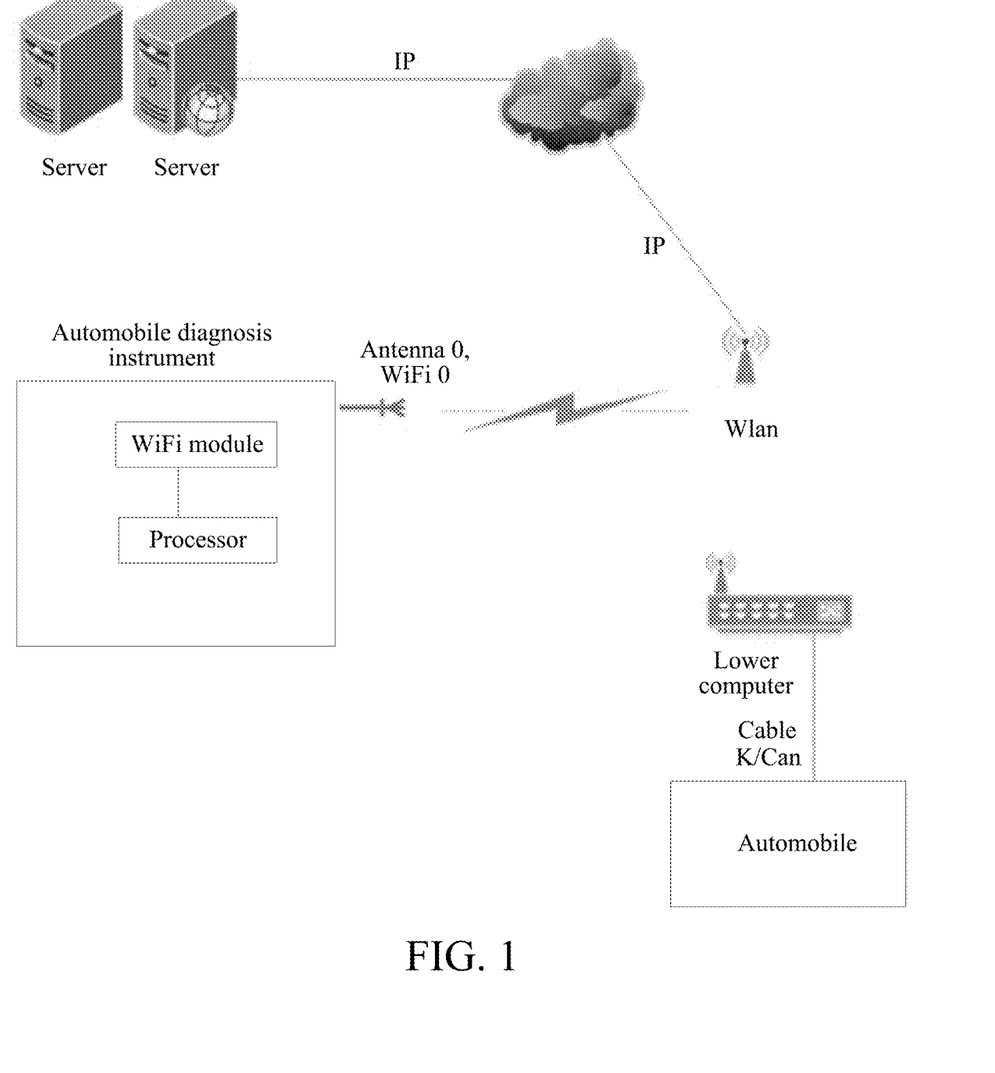
FIG. 1 is a diagram of an existing automobile diagnosis system.

FIG. 1 is a diagram of an existing automobile diagnosis system. As shown in FIG. 1, in the existing automobile diagnosis system, a lower computer usually works in an AP mode and an automobile diagnosis instrument works in an STA mode. The lower computer and a wireless local area network AP (LAN AP) are respectively used as two different APs located in different networks. When an automobile diagnosis instrument only has one WiFi channel, the Internet cannot be accessed during access to the lower computer, that is, the automobile diagnosis instrument cannot be connected to a server.

To resolve the foregoing technical problem, in the automobile diagnosis instrument in the embodiments of the present application, two WiFi channels are designed, so that when the automobile diagnosis instrument communicates with the lower computer, the Internet can also be accessed, thereby improving a diagnosis function of the automobile diagnosis instrument.

Specific embodiments are used below to describe the technical solutions of the present application in detail. The following specific embodiments may be mutually combined. Same or similar concepts or processes may not be repeatedly described in some embodiments.

Figure 2:
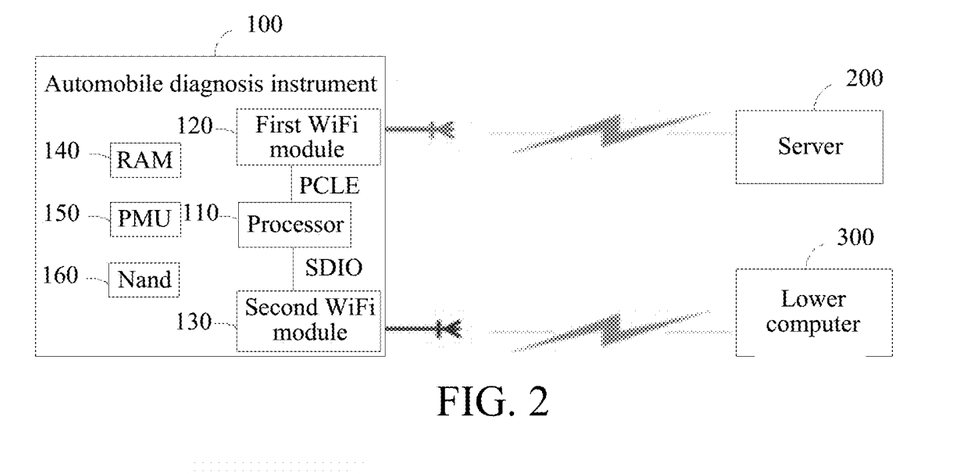
FIG. 2 is a schematic structural diagram of an automobile diagnosis instrument according to Embodiment 1 of the present invention.

FIG. 2 is a schematic structural diagram of an automobile diagnosis instrument according to Embodiment 1 of the present invention. As shown in FIG. 2, an automobile diagnosis instrument 100 in this embodiment includes: a processor 110, and a first WiFi unit 120 and a second WiFi unit 130 that are respectively connected to the processor 110. The processor 110 is configured to control the first WiFi unit 120 to be connected to a server 200 and control the second WiFi unit 130 to be connected to a lower computer 300.

WiFi has been widely used due to advantages such as a wide coverage, no wiring and a fast transmission speed. In most cases, WiFi of mobile terminals works in an STA mode. Information exchange with the Internet is implemented by means of access to an AP hotspot, for example, obtaining an Internet service or uploading diagnosis information by using the server. In the STA working mode, one WiFi can only be connected to one AP.

The automobile diagnosis instrument 100 in this embodiment includes the processor 110, the first WiFi unit 120 and the second WiFi unit 130. Both the first WiFi unit 120 and the second WiFi unit 130 are connected to the processor 110. The first WiFi unit 120 and the second WiFi unit 130 may work in an STA working mode or an AP working mode based on different application scenarios.

The first WiFi unit 120 and the second WiFi unit 130 in this embodiment may be hardware components having a WiFi function, such as a chip.

In an example, that the first WiFi unit 120 and the second WiFi unit 130 work in the STA working mode is used as an example. In an actual application, the processor 110 controls the first WiFi unit 120 to be connected to the server 200 and controls the second WiFi unit 130 to be connected to the lower computer 300. The first WiFi unit 120 and the second WiFi unit 130 do not interfere with each other. Therefore, the automobile diagnosis instrument 100 may be respectively connected to the server 200 and the lower computer 300, thereby implementing information communication with the server 200 and the lower computer 300 respectively. For example, vehicle data is obtained from the lower computer 300; a diagnosis strategy is obtained from the server 200; a vehicle is diagnosed according to the vehicle data and the diagnosis strategy.

Optionally, the server 200 in this embodiment may be any of a cloud server, a network server and a base station server.

It should be noted that, this embodiment is described by using a WiFi unit as an example, that is, the first WiFi unit 120 and the second WiFi unit 130 in the automobile diagnosis instrument 100 in this embodiment may further be replaced by other wireless communication units, for example, a Bluetooth module or a Zigbee unit, which is not limited herein.

Optionally, the first WiFi unit 120 and the second WiFi unit 130 in this embodiment may be replaced by a combination of any two existing wireless communication modules. For example, the first WiFi unit 120 is replaced with a Bluetooth unit and the second WiFi unit 130 is replaced with a Zigbee unit, which is not limited in this embodiment. Specific setting depends on an actual requirement.

Further, referring to FIG. 2, the automobile diagnosis instrument 100 in this embodiment includes a first interface and a second interface. The first WiFi unit 120 is connected to the processor 110 by using the first interface. The second WiFi unit 130 is connected to the processor 110 by using the second interface. In this way, the processor 110 may determine an identifier of an interface, to determine whether it is connected to the first WiFi unit 120 or the second WiFi unit 130. Standards used by the first interface and the second interface may be the same or different. If the standards used by the first interface and the second interface are different, the processor may determine whether it is connected to the first WiFi unit 120 or the second WiFi unit 130 according to a standard format used by received data.

For example, it is assumed that the first WiFi unit 120 can only be connected to the server 200, and the second WiFi unit 130 can only be connected to the lower computer 300. In this case, when receiving a message sent from the first interface, the processor 110 may determine that the message is received by the first WiFi unit 120, thereby determining that the message is sent by the server 200. When receiving a message sent from the second interface, the processor 110 may determine that the message is received by the second WiFi unit 130, thereby determining that the message is sent by the lower computer 300. Similarly, when the processor 110 needs to send a message to the server 200, the processor 110 sends the message to the first interface. The first interface sends the message to the first WiFi unit 120, so that the first WiFi unit 120 sends the message to the server 200. When the processor 110 needs to send a message to the lower computer 300, the processor 110 sends the message to the second interface. The second interface sends the message to the second WiFi unit 130, so that the second WiFi unit 130 sends the message to the lower computer 300.

The first interface or the second interface in this embodiment may be any of a universal serial bus (USB) interface, a PCIE interface, a SDIO interface and a universal asynchronous receiver/transmitter (Uart) interface. For example, both the first interface and the second interface are USB interfaces, PCIE interfaces or SDIO interfaces. Optionally, the first interface and the second interface may further be a combination of any two interfaces in the foregoing interfaces. For example, the first interface is a USB interface and the second interface is a PCIE interface; the first interface is a PCIE interface and the second interface is a USB interface; the first interface is a USB interface and the second interface is an SDIO interface; the first interface is an SDIO interface and the second interface is a USB interface; the first interface is an SDIO interface and the second interface is a PCIE interface; or the first interface is an SDIO interface and the second interface is a Uart. As shown in the figure, this embodiment shows a case in which the first interface is a PCIE interface and the second interface is an SDIO interface.

Optionally, as shown in FIG. 2, the automobile diagnosis instrument 100 in this embodiment further includes other universal units, such as a power management unit (PMU) 150, a random access memory (RAM) 140 and a NAND flash memory 160, which is not limited herein.

In the automobile diagnosis instrument provided in this embodiment of the present invention, the processor, and the first WiFi unit and the second WiFi unit respectively connected to the processor are disposed. The processor controls the first WiFi unit to be connected to the server and controls the second WiFi unit to be connected to the lower computer. That is, the automobile diagnosis instrument in this embodiment can be respectively connected to the server and the lower computer.

Figure 3:
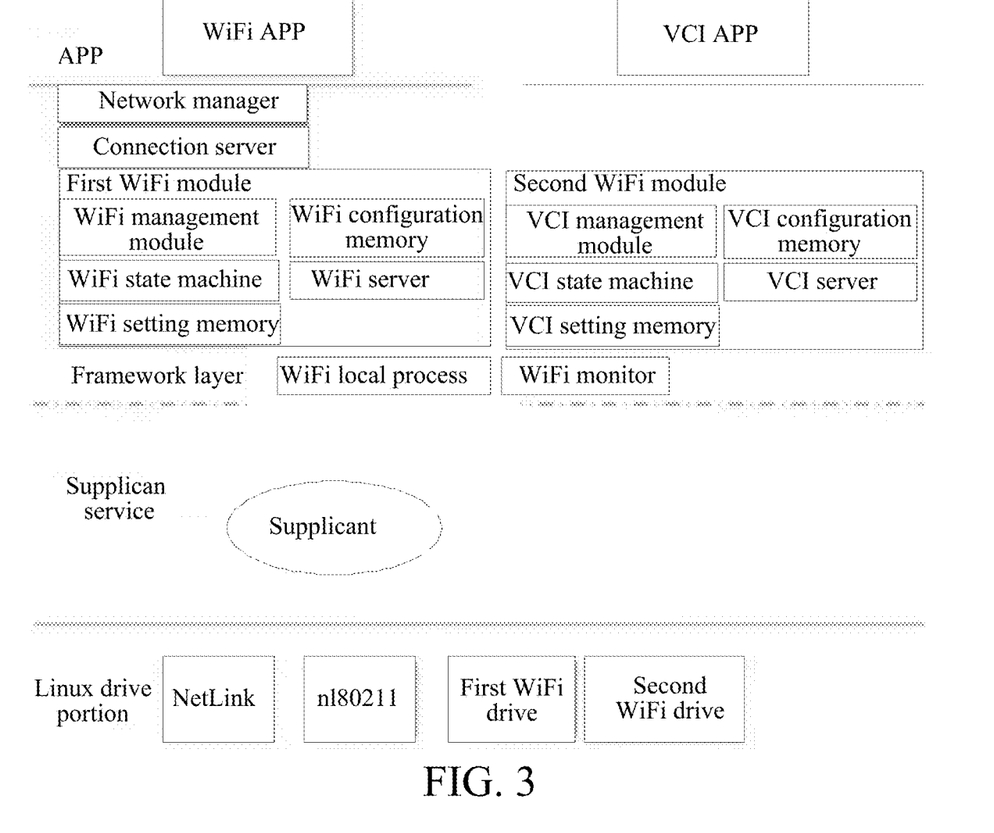
FIG. 3 is a schematic architectural diagram of an operating system in an automobile diagnosis instrument according to an embodiment of the present invention.

FIG. 3 is a schematic architectural diagram of an operating system in an automobile diagnosis instrument according to an embodiment of the present invention. It should be noted that, FIG. 3 uses an android operating as an example. A first WiFi unit 120 and a second WiFi unit 130 in this embodiment may further implement interaction with an upper layer application based on other operating systems, for example, based on an iOS Apple mobile operating system, a Blackberry system or another operating system. As shown in FIG. 3, an architecture of the operating system includes four layers, which are respectively:

(1) A Linux driving layer, used for power-on/power-off control of a hardware unit, transmitting and receiving of data, managing states of the first WiFi unit 120 and the second WiFi unit 130, managing an IEEE 802.11 communication protocol, communicating with an application layer, managing a command (a Net_LINK protocol and a file system) and the like.

(2) A Supplicant (process) service layer, which is open system service software used for maintenance of states of the first WiFi unit 120 and the second WiFi unit 130, command control, data exchange and the like. The Supplicant service layer exchanges data with a Linux kernel downwardly by using a NET_LINK (which is a communication protocol) protocol, and exchanges a command with the Linux kernel by using a file system. The Supplicant service layer communicates with an upper layer application by using a socket (which is an interface), where the called interface is encapsulated by using Wpa_ctrl.

(3) An Android Framework layer, which is mainly responsible for maintenance of a WiFi state machine, drive loading, management of a Supplicant service module, storing and restoration of configuration data, connection management and providing a convenient WiFi operating interface for an APP layer. A framework portion communicates with the Supplicant service module by using a socket, and communicates with an application layer through inter process communication (IPC).

(4) An Android APP application portion, providing a specific WiFi APP application.

In this embodiment, a first driving program corresponding to an identifier of the first WiFi unit and a second driving program corresponding to an identifier of the second WiFi unit are configured in a driving layer (that is, the Linux driving layer in FIG. 3) of a system of the automobile diagnosis instrument. The identifier of the first WiFi unit is different from the identifier of the second WiFi unit. In this case, the processor 110 may control turn-on or turn-off of the first WiFi unit 120 according to the identifier of the first WiFi unit 120, and control turn-on or turn-off of the second WiFi unit 130 according to the identifier of the second WiFi unit 130.

Specifically, different driving programs are respectively configured for the first WiFi unit 120 and the second WiFi unit 130. In this way, the processor 110 may distinguish, according to identifiers, whether to call the first driving program of the first WiFi unit 120 or the second driving program of the second WiFi unit 130. For example, the processor 110 calls the first driving program of the first WiFi unit 120 according to the identifier of the first WiFi unit 120, to control turn-on or turn-off of the first WiFi unit 120. Similarly, the processor 110 calls the second driving program of the second WiFi unit 130 according to the identifier of the second WiFi unit 130, to control turn-on or turn-off of the second WiFi unit 130.

In an actual scenario, when the processor 110 needs to obtain a diagnosis strategy from a server 200, the processor 110 calls the first driving program, to control the first WiFi unit 120 to turn on, and sends a request message to the server 200 by using the first WiFi unit 120. The request message carries the identifier of the first WiFi unit 120 in addition to a request event. After obtaining a response result of the request event, the server 200 sends, according to the identifier of the first WiFi unit 120, the response result to the processor 110 by using the first WiFi unit 120.

Similarly, when the processor 110 needs to obtain vehicle information, the processor 110 calls the second driving program, to control the second WiFi unit 130 to turn on, and sends a request message to a lower computer 300 by using the second WiFi unit 130. The request message carries the identifier of the second WiFi unit 130 in addition to a request event. After obtaining a response result of the request event, the lower computer 300 sends, according to the identifier of the second WiFi unit 130, the response result to the processor 110 by using the second WiFi unit 130.

A service module for managing a first configuration file corresponding to the first WiFi unit and a second configuration file corresponding to the second WiFi unit is configured in a service layer (that is, the Supplicant service layer in FIG. 3) of the operating system of the automobile diagnosis instrument.

Specifically, by default, an existing Supplicant service module supports management of a plurality of wlan interfaces. However, only one WiFi interface is usually configured in startup configuration parameters. If two WiFi units need to be managed, startup configuration parameters in an init.rc startup configuration file in Linux may be configured as follows:

service wpa_Supplicant /system/bin/wpa_Supplicant -Dn180211 -iwlan0
  -c/data/misc/WiFi/wpa_Supplicant.conf
  -I/system/etc/WiFi/wpa_Supplicant.conf
  -iwlan1 -c/data/misc/WiFi/vci_Supplicant.conf
  -I/system/etc/WiFi/vci_Supplicant_overlay.conf
  -e/data/misc/WiFi/entropy.bin
  -0/data/misc/WiFi/sockets -g@android:wpa_wlan0
    class main
    socket wpa_wlan0 dgram 660 WiFi WiFi
    disabled
    oneshot Parameters -iwlan0 and -iwlan1 respectively indicate that the Supplicant service module is needed to manage the two WiFi interfaces of the first WiFi unit and the second WiFi unit. The first configuration file is wpa_Supplicant.conf and the second configuration file is vci_Supplicant.conf. The configuration files are both located under a catalog of /data/misc/.

In a framework layer (that is, the Framework layer in FIG. 3) of the system of the automobile diagnosis instrument, a corresponding first functional module group is configured for the first WiFi unit 120 and a corresponding second functional module group is configured for the second WiFi unit 130. The first functional module group and the second functional module group share a WiFi Native module. Alternatively, the first functional module group and the second functional module group are independent from each other.

Specifically, different functional module groups are configured for the first WiFi unit 120 and the second WiFi unit 130 in the framework layer of the operating system of the automobile diagnosis instrument in this embodiment. For example, as shown in FIG. 3, the first functional module group configured for the first WiFi unit 120 may include: a WiFi Manager (a WiFi management module), a WiFi ConfigStorer (a WiFi configuration memory), a WiFi StateMachine (a WiFi state machine), a WiFi Service (a WiFi server), a WiFi SettingStore (a WiFi setting memory), a WiFi Monitor (a WiFi monitor), a WiFi Native (a WiFi local process) and the like.

The second functional module group configured for the second WiFi unit 130 may include: a VCI Manager (a vehicle communication interface manager), a VCI ConfigStorer (a VCI configuration memory), a VCI StateMachine (a VCI state machine), a VCI Service (a VCI server), a VCI SettingStore (a VCI setting memory) and a WiFi Native. Herein, the configuration of the second functional module group is described based on an assumption that the lower computer to be communicated with the second WiFi unit 130 is a VCI. If the lower computer is another device, another functional module group for the second WiFi unit may be accordingly configured, which is not limited herein.

The WiFi Manager may be configured to perform information exchange with an upper application program, and may manage each WiFi functional module, that is, all the upper application programs may implement functions of WiFi by interacting with the WiFi Manager.

In a wireless network portion of Android, the WiFi ConfigStore is mainly responsible for management of network configuration information, including storing and reading the configuration information. When a network storing action, a network connecting action or an auto_connect automatic reconnection action is triggered in Settings, the WiFi ConfigStore may be called.

The WiFi StateMachine is configured to manage a state of each process of WiFi in Android. A cumbersome process is divided into many branch states, which facilitates management. In addition, code has a clearer structure and is easy to read. The WiFi StateMachine manages each state of WiFi, such as drive loading, connection, scanning and disconnection.

The WiFi Service is a core service that is responsible for WiFi functions in the Framework layer, which manages and controls the WiFi functions in an Android platform by using wpa-Supplicant (WPAS for short).

The WiFi SettingStore undertakes a task of distributing an event from a wpa_Supplicant underlying layer in a WiFi system of Android. After an upper layer delivers an instruction, such as scanning or connecting of WiFi, an underlying drive and wpa_s perform actual scanning and connection operations. After the operations are completed, an event is fed back to the upper layer, to inform whether Framework scanning is finished and whether connection succeeds.

It should be noted that, a function of each module in the second functional module group is the same as a function of each module in the first functional module group. Details are omitted in this embodiment.

It may be known from the above that, the first functional module group and the second functional module group in this embodiment share a WiFi Native module and/or a WiFi Monitor module. The WiFi Native module is configured to turn on and turn off the Supplicant service module, turn on and turn off a WiFi Monitor module process, deliver a command to the Supplicant service module, update the WiFi StateMachine, and process a remote WiFi operation sent by another module by using the WiFi Manager interface.

Referring to FIG. 3 again, the WiFi Native module in this embodiment is further configured to control a Socket access authority with which the Framework layer communicates with the Supplicant service module. For example, the WiFi Native controls, according to the identifier of the first WiFi unit 120, the Supplicant service module to communicate with the first functional module group, and controls, according to the identifier of the second WiFi unit 130, the Supplicant service module to communicate with the second functional module group.

That is, in the method in this embodiment, the first functional module group is configured for the first WiFi unit 120. The second functional module group is configured for the second WiFi unit 130. The first functional module group and the second functional module group share the WiFi Native module and/or the WiFi Monitor module. In this way, not only that the first WiFi unit 120 and the second WiFi unit 130's independency from each other is ensured, but also configuration processes of the first WiFi unit 120 and the second WiFi unit 13 is simplified.

In another possible implementation of this embodiment, firmware corresponding to the first WiFi unit in the automobile diagnosis instrument is the same as or different from firmware corresponding to the second WiFi unit.

When the firmware corresponding to the first WiFi unit 120 is the same as the firmware corresponding to the second WiFi unit 130, the first WiFi unit 120 and the second WiFi unit 130 share the firmware.

Specifically, when the firmware corresponding to the first WiFi unit 120 is the same as the firmware corresponding to the second WiFi unit 130, if either of the first WiFi unit 120 and the second WiFi unit 130 loads the firmware, the other module does not need to load the firmware. When the firmware needs to be unloaded, the firmware may be unloaded only when neither of the first WiFi unit 120 and the second WiFi unit 130 works, thereby simplifying driving processes of the first WiFi unit 120 and the second WiFi unit 130. Meanwhile, a problem of resource wasting caused when firmware is respectively configured for the first WiFi unit 120 and the second WiFi unit 130 is avoided.

When the firmware corresponding to the first WiFi unit 120 is different from the firmware corresponding to the second WiFi unit 130, the firmware of the first WiFi unit 120 and the firmware of the second WiFi unit 130 are independent from each other, and do not interfere with each other.

Optionally, the first WiFi unit 120 and the second WiFi unit 130 in this embodiment share the Supplicant service module. Specifically, when either of the first WiFi unit 120 and the second WiFi unit 130 starts the Supplicant service module, the other module does not need to start the Supplicant service module. When the Supplicant service module needs to be turned off, the Supplicant service module may be turned off when both the first WiFi unit 120 and the second WiFi unit 130 stop working, thereby avoiding a problem of resource wasting caused when the Supplicant service module is respectively configured for the first WiFi unit 120 and the second WiFi unit 130.

Optionally, the first WiFi unit 120 in this embodiment includes an open interface, which allows another application and a third-party APP (application) to access by using the open interface. The second WiFi unit 130 includes a private interface, which only allows an APP (for example, a VCI APP in FIG. 3) on the lower computer 300 to access, and does not allow the third-party APP to access.

In the automobile diagnosis instrument in this embodiment of the present invention, the first driving program corresponding to the identifier of the first WiFi unit and the second driving program corresponding to the identifier of the second WiFi unit are configured in the driving layer of the system of the automobile diagnosis instrument. The service module for managing the first configuration file corresponding to the first WiFi unit and the second configuration file corresponding to the second WiFi unit is configured in the service layer of the system of the automobile diagnosis instrument. The first functional module group corresponding to the first WiFi unit and the second functional module group corresponding to the second WiFi unit are configured in the framework layer of the system of the automobile diagnosis instrument. Therefore, the first WiFi unit and the second WiFi unit are independent. In this way, the automobile diagnosis may communicate with any application by using the first WiFi unit and communicate with the lower computer by using the second WiFi unit.

Figure 4:
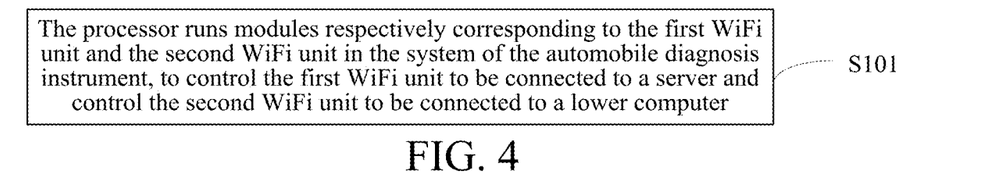
FIG. 4 is a schematic flowchart of a method for running a system of the automobile diagnosis instrument according to Embodiment 1 of the present invention.

FIG. 4 is a schematic flowchart of a method for running a system of the automobile diagnosis instrument according to Embodiment 1 of the present invention. This embodiment is executed by the automobile diagnosis instrument described in the foregoing embodiments. The automobile diagnosis instrument includes: a processor, and a first WiFi unit and a second WiFi unit that are respectively connected to the processor. As shown in FIG. 4, the method in this embodiment may include:

S101. The processor runs modules respectively corresponding to the first WiFi unit and the second WiFi unit in the system of the automobile diagnosis instrument, to control the first WiFi unit to be connected to a server and control the second WiFi unit to be connected to a lower computer.

Specifically, as shown in FIG. 3, corresponding modules are respectively configured in advance for the first WiFi unit and the second WiFi unit in the system of the automobile diagnosis instrument. In actual use, the processor controls the first WiFi unit to be connected to the server by calling each module corresponding to the first WiFi unit, and controls the second WiFi unit to be connected to the lower computer (such as a VCI device) by calling each module corresponding to the second WiFi unit. The lower computer being a VCI device is taken as an example. In this case, the processor may obtain a vehicle diagnosis strategy from the server, and obtain vehicle data from the lower computer. Subsequently, diagnosis is performed on a vehicle according to the vehicle data and the diagnosis strategy, which ensures diagnosis in normal process, thereby improving reliability of vehicle diagnosis.

Figure 5:
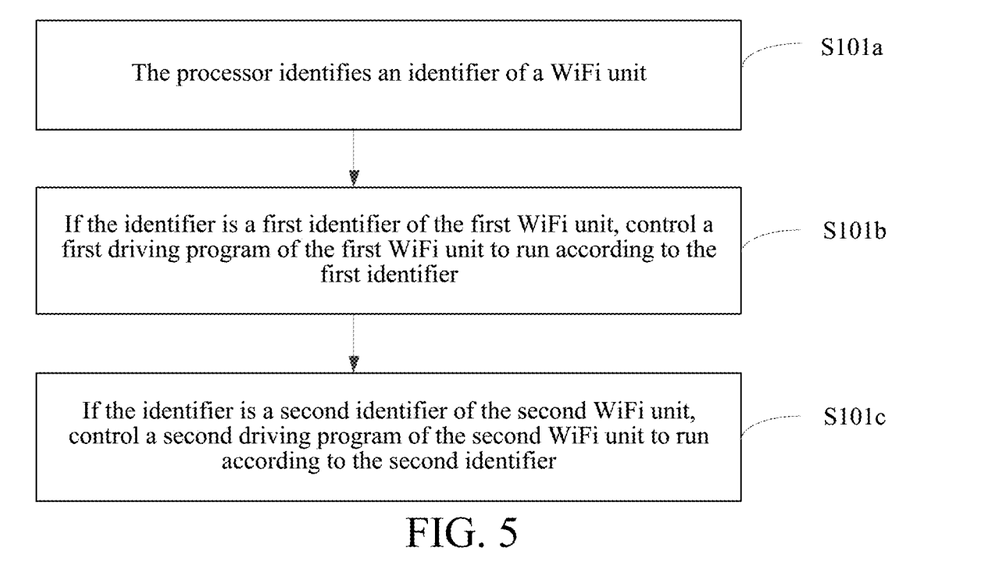
FIG. 5 is a schematic flowchart of a first method for running a system of the automobile diagnosis instrument according to Embodiment 1 of the present invention.

In a possible implementation of this embodiment, as shown in FIG. 5, the running, by the processor, modules respectively corresponding to the first WiFi unit and the second WiFi unit in the system of the automobile diagnosis instrument in S101 may specifically include:

S101*a*. The processor identifies an identifier of a WiFi unit.

S101*b*. If the identifier is a first identifier of the first WiFi unit, control a first driving program of the first WiFi unit to run according to the first identifier.

S101*c*. If the identifier is a second identifier of the second WiFi unit, control a second driving program of the second WiFi unit to run according to the second identifier.

Specifically, referring to FIG. 3, to ensure independence of the first WiFi unit and the second WiFi unit, driving programs of the first WiFi unit and the second WiFi unit are independent. As shown in FIG. 3, in a driving layer of the system of the automobile diagnosis instrument, that is, in a Linux operating system, a first driving program is configured for the first WiFi unit and a second driving program is configured for the second WiFi unit. Moreover, a first identifier is configured for the first WiFi unit and a second identifier is configured for the second WiFi unit.

In this way, when a Linux module drive is started, different driving programs run according to identifiers of the first WiFi unit and the second WiFi unit during a matching process of a device and a drive. Specifically, the processor calls the first driving program to run according to the first identifier, and calls the second driving program to run according to the second identifier.

For example, the first identifier of the first WiFi unit is marked as wlan0 and the second identifier of the second WiFi unit is marked as wlan1. As show in FIG. 3, when a Supplicant service module in a service layer exchanges information with an nl80211 (an interface that calls a WiFi-related function of a kernel for a user space) driving program in a driving layer, it is specified in a Net_LINK (network connection) protocol that an NL80211_ATTR_IFINDEX (an attribute function) attribute is particularly an identifier of a WiFi unit. When the first WiFi unit and a drive interface of the first WiFi unit are started in the Supplicant, the identifier of the WiFi unit is obtained from a Linux kernel by a file system through ioctl (a function that manages an I/O channel of a device in a device driving program).

Similarly, after a Linux driving layer receives a NET_LINK message, it is learned, by determining whether an identifier is carried in the NL80211_ATTR_IFINDEX attribute, whether to call a driver of the first WiFi unit or a driver of the second WiFi unit to process received data. When the Linux kernel reports a message to the Supplicant service module, whether to send the message to the first WiFi unit or the second WiFi unit is also determined by marking the NL80211_ATTR_IFINDEX attribute in the NET_LINK.

Figure 6:
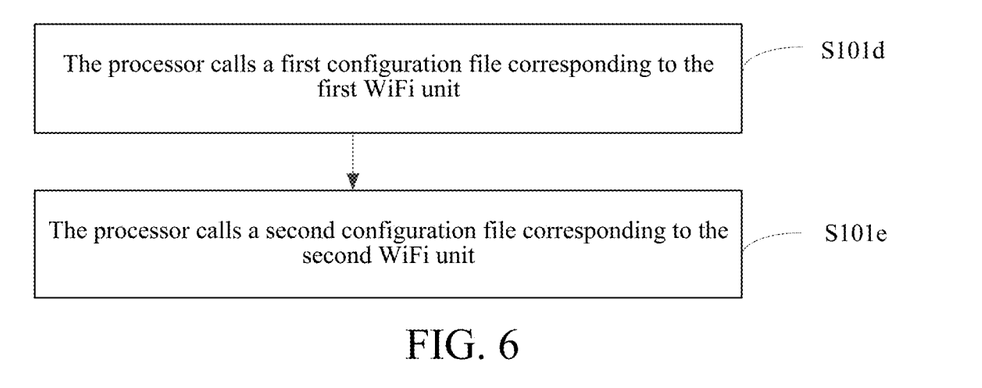
FIG. 6 is a schematic flowchart of a second method for running a system of the automobile diagnosis instrument according to Embodiment 1 of the present invention.

In a possible implementation of this embodiment, as shown in FIG. 6, the running, by the processor, modules respectively corresponding to the first WiFi unit and the second WiFi unit in the system of the automobile diagnosis instrument in S101 may specifically include:

S101d. The processor calls a first configuration file corresponding to the first WiFi unit.

S101e. The processor calls a second configuration file corresponding to the second WiFi unit.

Specifically, referring to the description of the foregoing embodiments, a service module for managing a first configuration file corresponding to the first WiFi unit and a second configuration file corresponding to the second WiFi unit is configured in a service layer of the system of the automobile diagnosis instrument in advance. The service module has different interfaces for the configuration files corresponding to the first WiFi unit and the second WiFi unit. For example, a configuration file interface corresponding to the first WiFi unit is iwlan0 and a configuration file interface corresponding to the second WiFi unit is iwlan1.

In an actual application, the processor calls the configuration file corresponding to the first WiFi unit by using the iwlan0 interface and calls the configuration file corresponding to the second WiFi unit by using the iwlan1 interface.

Figure 7:
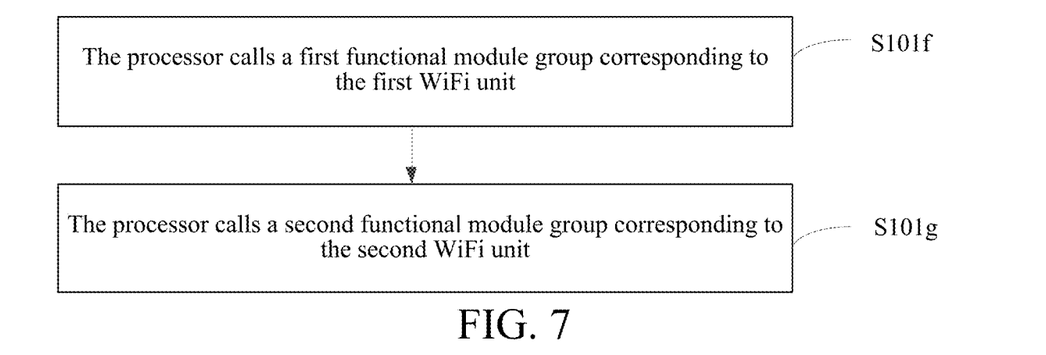
FIG. 7 is a schematic flowchart of a third method for running a system of the automobile diagnosis instrument according to Embodiment 1 of the present invention.

In a possible implementation of this embodiment, as shown in FIG. 7, the running, by the processor, modules respectively corresponding to the first WiFi unit and the second WiFi unit in the system of the automobile diagnosis instrument in S101 may specifically include:

S101f. The processor calls a first functional module group corresponding to the first WiFi unit.

S101g. The processor calls a second functional module group corresponding to the second WiFi unit.

The first functional module group and the second functional module group share a WiFi Native module. Alternatively, the first functional module group and the second functional module group are independent from each other.

Specifically, as shown in FIG. 3, in this embodiment, in a framework layer of the system of the automobile diagnosis instrument, a corresponding first functional module group is configured for the first WiFi unit 120 and a second functional module group is configured for the second WiFi unit 130 in advance.

The first functional module group may include: a WiFi Manager, a WiFi ConfigStorer, a WiFi StateMachine, a WiFi Service, a WiFi SettingStore, a WiFi Monitor and a WiFi Native.

The second functional module group may include: a VCI Manager, a VCI ConfigStorer, a VCI StateMachine, a VCI Service, a VCI SettingStore and a WiFi Native.

In an actual application, the processor calls the first driving program according to the identifier of the first WiFi unit, and calls the configuration file corresponding to the first WiFi unit by using the iwlan0 interface. Subsequently, the processor calls at least one functional module in the first functional module group corresponding to the first WiFi unit, and controls the first WiFi unit to implement a corresponding function. Similarly, the processor calls the second driving program according to the identifier of the second WiFi unit, and calls the configuration file corresponding to the second WiFi unit by using the iwlan1 interface. Subsequently, the processor calls at least one functional module in the second functional module group corresponding to the second WiFi unit, and controls the second WiFi unit to implement a corresponding function. A function implementing process of each functional module in the first functional module group and the second functional module group is well known to a person skilled in the art. Details are omitted herein.

In the method for running the system of the automobile diagnosis instrument according to the embodiments of the present invention, the processor runs the modules respectively corresponding to the first WiFi unit and the second WiFi unit in the system of the automobile diagnosis instrument, to control the first WiFi unit to be connected to the server and control the second WiFi unit to be connected to the lower computer. For example, the first driving program of the first WiFi unit is controlled to run by using the first identifier of the first WiFi unit; the second driving program of the second WiFi unit is controlled to run by using the second identifier of the second WiFi unit. Alternatively, the processor calls the first configuration file corresponding to the first WiFi unit; the processor calls the second configuration file corresponding to the second WiFi unit. Alternatively, the processor calls the first functional module group corresponding to the first WiFi unit and the processor calls the second functional module group corresponding to the second WiFi unit, so that the automobile diagnosis instrument is simultaneously connected to the server and the lower computer, to expand function implementation of the automobile diagnosis instrument.

Figure 8:
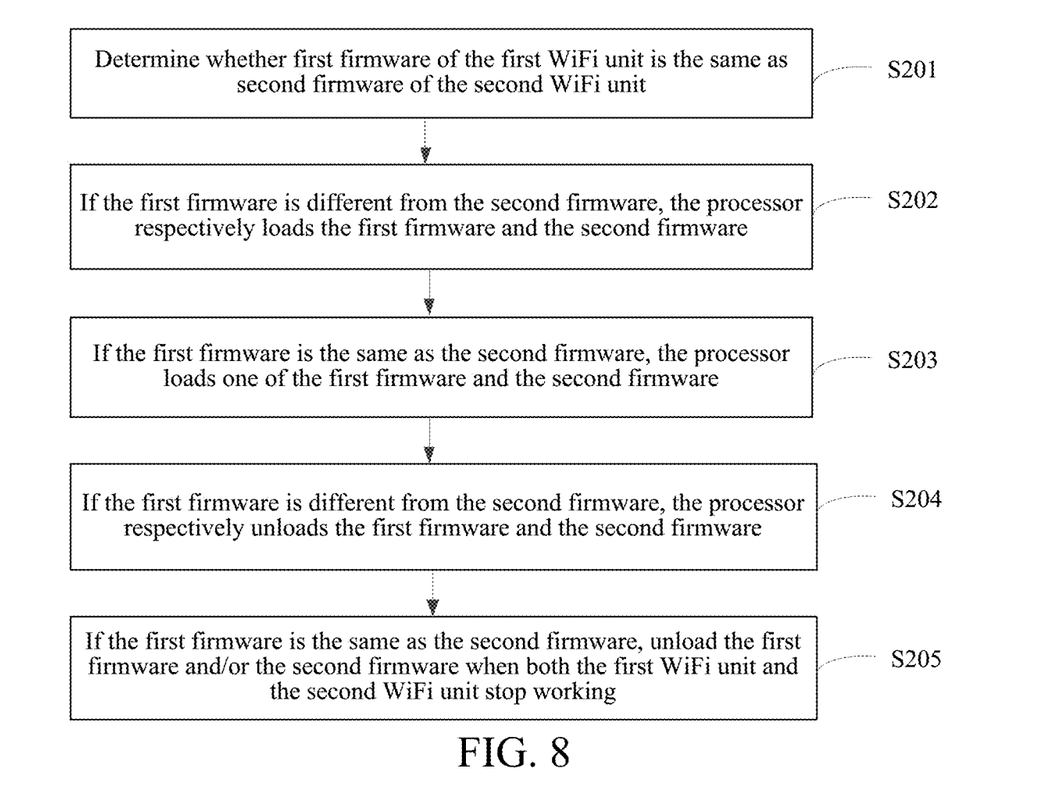
FIG. 8 is a schematic flowchart of a method for running a system of an automobile diagnosis instrument according to Embodiment 2 of the present invention.

FIG. 8 is a schematic flowchart of a method for running a system of an automobile diagnosis instrument according to Embodiment 2 of the present invention. Based on the foregoing embodiments, the running, by the processor, modules respectively corresponding to the first WiFi unit and the second WiFi unit in the system of the automobile diagnosis instrument in S101 may specifically include:

S201. Determine whether first firmware of the first WiFi unit is the same as second firmware of the second WiFi unit.

S202. If the first firmware is different from the second firmware, the processor respectively loads the first firmware and the second firmware.

S203. If the first firmware is the same as the second firmware, the processor loads one of the first firmware and the second firmware.

Specifically, when the first firmware of the first WiFi unit is different from the second firmware of the second WiFi unit, the first firmware of the first WiFi unit and the second firmware of the second WiFi unit are respectively loaded by the processor.

When the first firmware is the same as the second firmware, for example, when the first firmware and the second firmware are firmware in the same batch produced by a manufacturer, it may be set that the first WiFi unit and the second WiFi unit share the first firmware and the second firmware. The processor loads one of the first firmware and the second firmware.

In this embodiment, after the determining whether first firmware of the first WiFi unit is the same as second firmware of the second WiFi unit, the method further includes:

S204. If the first firmware is different from the second firmware, the processor respectively unloads the first firmware and the second firmware.

S205. If the first firmware is the same as the second firmware, unload the first firmware and the second firmware when both the first WiFi unit and the second WiFi unit stop working.

Similarly, during unloading of the first firmware and the second firmware, when the first firmware is different from the second firmware, the first firmware and the second firmware may be respectively unloaded because the first firmware and the second firmware are independent from each other.

When the first firmware is the same as the second firmware, and the first WiFi unit and the second WiFi unit share firmware, the first firmware and/or the second firmware may be unloaded after both the first WiFi unit and the second WiFi unit stop working, thereby ensuring normal operation of the first WiFi unit and the second WiFi unit.

Figure 9:
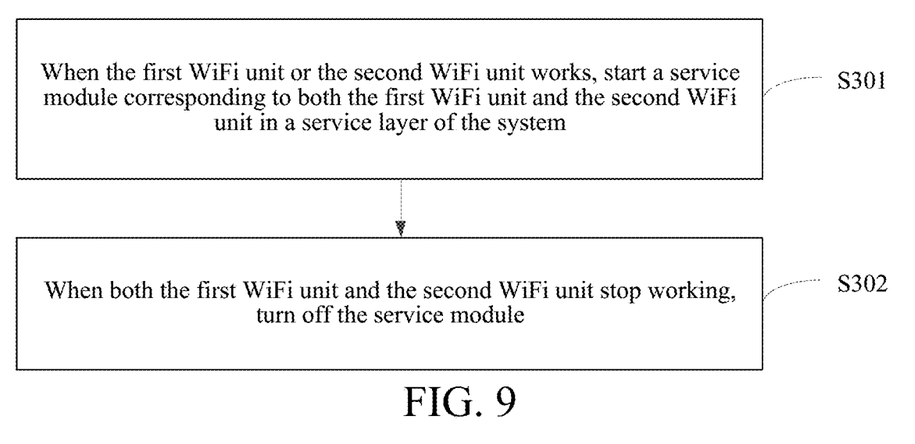
FIG. 9 is a schematic flowchart of a method for running a system of an automobile diagnosis instrument according to Embodiment 3 of the present invention.

FIG. 9 is a schematic flowchart of a method for running a system of an automobile diagnosis instrument according to Embodiment 3 of the present invention. Based on the foregoing embodiments, the running, by the processor, modules respectively corresponding to the first WiFi unit and the second WiFi unit in the system of the automobile diagnosis instrument in S101 may specifically include:

S301. When the first WiFi unit or the second WiFi unit works, start a service module corresponding to both the first WiFi unit and the second WiFi unit in a service layer of the system.

S302. When both the first WiFi unit and the second WiFi unit stop working, turn off the service module.

It may be learned from the above that, a service module for managing a first configuration file corresponding to the first WiFi unit and a second configuration file corresponding to the second WiFi unit is configured in the service layer of the system of the automobile diagnosis instrument. The first WiFi unit and the second WiFi unit share the service module.

In this way, when the first WiFi unit or the second WiFi unit works, the service module in the service layer of the system is started. For example, when the first WiFi unit started earlier has started a Supplicant service module, the second WiFi unit does not need to request to start the Supplicant service module. If it is determined that the first WiFi unit has not start the Supplicant service module, the first WiFi unit sends a starting request to the Supplicant service module, to start the Supplicant service module.

When the Supplicant service module is to be turned off, to ensure that the first WiFi unit and the second WiFi unit run normally, the Supplicant service module may be turned off when both the first WiFi unit and the second WiFi unit stop working.

Optionally, calling of a WiFi Native module in this embodiment may have two scenarios:

Scenario 1: after a command is sent, returned data is needed immediately.

Scenario 2: after a command is sent, returning is immediately performed, returned data that is required being read by using a WiFi Monitor monitoring process.

Both the two scenarios are serialized in a same access process. Mutex is added in all access functions, to ensure that two WiFi channels are serialized accessed and do not interfere with each other.

In the configuration method of the automobile diagnosis instrument in the embodiments of the present invention, when firmware of the first WiFi unit and firmware of the second WiFi unit are the same, the first WiFi unit and the second WiFi unit share the firmware. Simultaneously, the first WiFi unit and the second WiFi unit share the Supplicant service module, so that a starting process of the automobile diagnosis instrument is simplified, and resources are saved.

Figure 10:
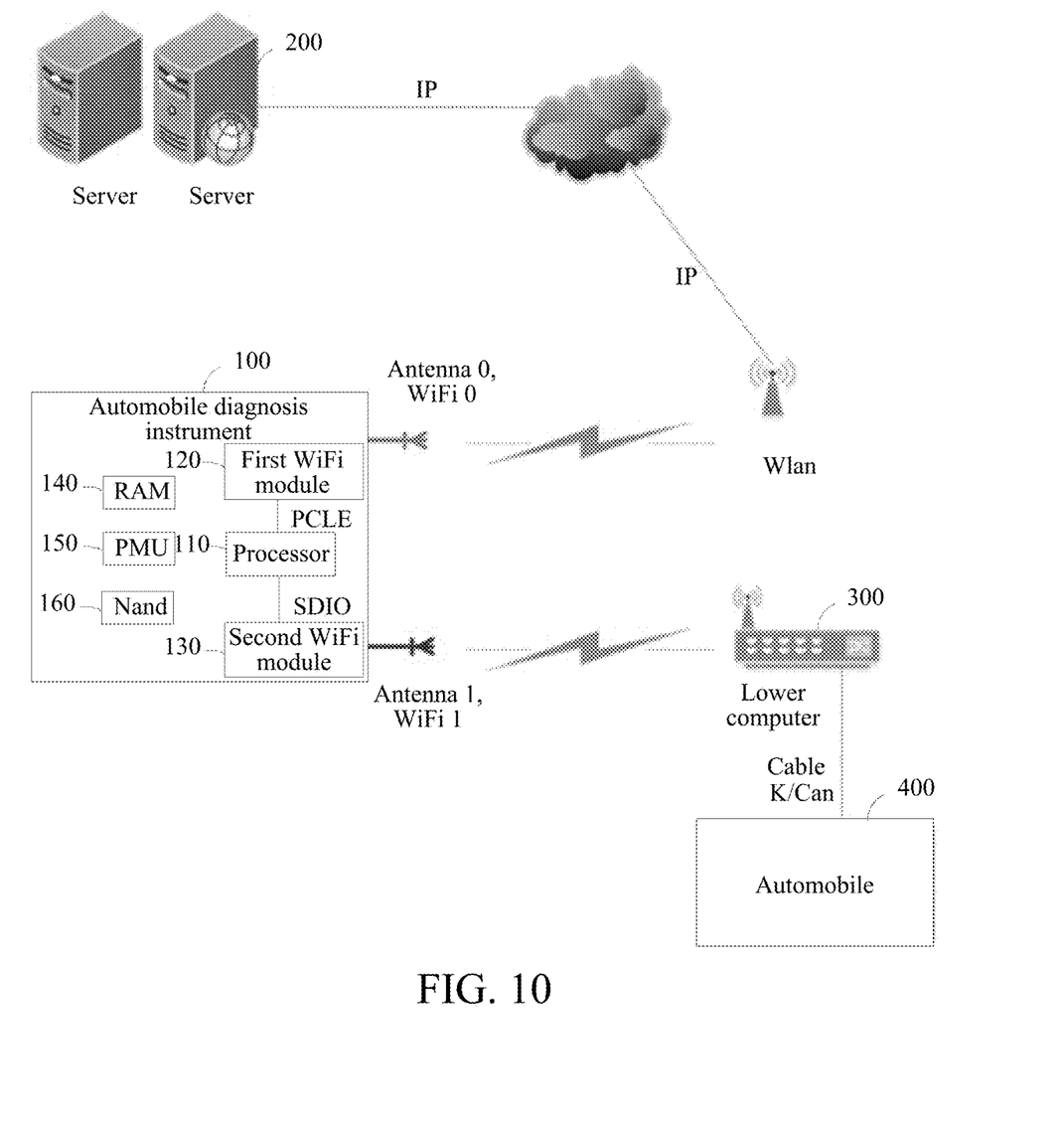
FIG. 10 is a schematic diagram of an automobile diagnosis system according to an embodiment of the present invention.

FIG. 10 is a schematic diagram of an embodiment of an automobile diagnosis system according to the present invention. As shown in FIG. 10, the automobile diagnosis system in this embodiment includes: a server 200, the automobile diagnosis instrument 100 described in the foregoing embodiments, a lower computer 300 and an automobile 400. The automobile diagnosis instrument 100 is connected to the server 200 by using a first WiFi unit 120. The automobile diagnosis instrument 100 is connected to the lower computer 300 by using a second WiFi unit 130. The lower computer 300 is connected to the automobile 400.

For a specific working process of this embodiment, refer to the descriptions of the foregoing embodiments. Details are omitted herein.

Finally, it should be noted that the foregoing embodiments are merely used for describing the technical solutions of the present invention, but are not intended to limit the present invention. Although the present invention is described in detail with reference to the foregoing embodiments, a person of ordinary skill in the art should understand that, modifications may still be made to the technical solutions in the foregoing embodiments, or equivalent replacements may be made to a part or all of the technical features. These modifications or replacements will not cause the essence of corresponding technical solutions to depart from the scope of the technical solutions in the embodiments of the present invention.

What is claimed is:

1. An automobile diagnosis instrument, comprising: a processor, and a first wireless fidelity (WiFi) unit and a second WiFi unit that are respectively connected to the processor, wherein the processor is configured to control the first WiFi unit to be connected to a server and control the second WiFi unit to be connected to a lower computer by using a system of the automobile diagnosis instrument; and the system of the automobile diagnosis instrument comprises a driving layer, a service layer and a framework layer; and the driving layer, the service layer and the framework layer each comprise modules respectively corresponding to the first WiFi unit and the second WiFi unit;

wherein a first functional module group corresponding to the first WiFi unit and a second functional module group corresponding to the second WiFi unit are configured in the framework layer of the system of the automobile diagnosis instrument; wherein the first functional module group and the second functional module group share a WiFi Native module; or the first functional module group and the second functional module group are independent from each other;

wherein when the first functional module group and the second functional module group share the WiFi Native module, the first WiFi unit comprises an open interface, and the second WiFi unit comprises a private interface.

2. The automobile diagnosis instrument according to claim 1, further comprising a first interface and a second interface, wherein the first WiFi unit is connected to the processor by using the first interface, and the second WiFi unit is connected to the processor by using the second interface.

3. The automobile diagnosis instrument according to claim 2, wherein the first interface or the second interface comprises any of a peripheral component interface express (PCIE) interface, a secure digital input and output automobiled (SDIO) interface, a universal asynchronous receiver/transmitter (Uart) interface and a universal serial bus (USB) interface.

4. The automobile diagnosis instrument according to claim 1, wherein a first driving program corresponding to an identifier of the first WiFi unit and a second driving program corresponding to an identifier of the second WiFi unit are configured in the driving layer of the system of the automobile diagnosis instrument; and the identifier of the first WiFi unit is different from the identifier of the second WiFi unit.

5. The automobile diagnosis instrument according to claim 4, wherein firmware corresponding to the first WiFi unit is the same as or different from firmware corresponding to the second WiFi unit.

6. The automobile diagnosis instrument according to claim 1, wherein a service module configured to manage a first configuration file corresponding to the first WiFi unit and a second configuration file corresponding to the second WiFi unit is configured in the service layer of the system of the automobile diagnosis instrument.

7. A method for running a system of an automobile diagnosis instrument, wherein the method is applied to an automobile diagnosis instrument, the automobile diagnosis instrument comprises: a processor, and a first wireless fidelity (WiFi) unit and a second WiFi unit that are respectively connected to the processor, and the method comprises:

running, by the processor, modules respectively corresponding to the first WiFi unit and the second WiFi unit in the system of the automobile diagnosis instrument, to control the first WiFi unit to be connected to a server, and control the second WiFi unit to be connected to a lower computers;

wherein a first functional module group corresponding to the first WiFi unit and a second functional module group corresponding to the second WiFi unit are configured in the framework layer of the system of the automobile diagnosis instrument; wherein the first functional module group and the second functional module group share a WiFi Native module; or the first functional module group and the second functional module group are independent from each other;

wherein when the first functional module group and the second functional module group share the WiFi Native module, the first WiFi unit comprises an open interface, and the second WiFi unit comprises a private interface.

8. The method according to claim 7, wherein the running, by the processor, modules respectively corresponding to the first WiFi unit and the second WiFi unit in the system of the automobile diagnosis instrument comprises:

identifying, by the processor, an identifier of a WiFi unit;

if the identifier is a first identifier of the first WiFi unit, controlling a first driving program of the first WiFi unit to run according to the first identifier; and if the identifier is a second identifier of the second WiFi unit, controlling a second driving program of the second WiFi unit to run according to the second identifier.

9. The method according to claim 7, wherein the running, by the processor, modules respectively corresponding to the first WiFi unit and the second WiFi unit in the system of the automobile diagnosis instrument comprises:

calling, by the processor, a first configuration file corresponding to the first WiFi unit; and calling, by the processor, a second configuration file corresponding to the second WiFi unit.

10. The method according to claim 7, wherein the running, by the processor, modules respectively corresponding to the first WiFi unit and the second WiFi unit in the system of the automobile diagnosis instrument comprises:

calling, by the processor, at least one functional module in a first functional module group corresponding to the first WiFi unit; and calling, by the processor, at least one functional module in a second functional module group corresponding to the second WiFi unit, wherein the first functional module group and the second functional module group share a WiFi Native module; or the first functional module group and the second functional module group are independent from each other.

11. The method according to claim 7, wherein the running, by the processor, modules respectively corresponding to the first WiFi unit and the second WiFi unit in the system of the automobile diagnosis instrument comprises:

determining whether first firmware of the first WiFi unit is the same as second firmware of the second WiFi unit;

if the first firmware is different from the second firmware, loading, by the processor, the first firmware and the second firmware respectively; and if the first firmware is the same as the second firmware, loading, by the processor, one of the first firmware and the second firmware.

12. The method according to claim 11, wherein after the determining whether first firmware of the first WiFi unit is the same as second firmware of the second WiFi unit, the method further comprises:

if the first firmware is different from the second firmware, unloading the first firmware and the second firmware respectively; and if the first firmware is the same as the second firmware, unloading the first firmware and/or the second firmware when both the first WiFi unit and the second WiFi unit stop working.

13. The method according to claim 7, wherein the running, by the processor, modules respectively corresponding to the first WiFi unit and the second WiFi unit in the system of the automobile diagnosis instrument comprises:

when the first WiFi unit or the second WiFi unit works, starting a service module corresponding to both the first WiFi unit and the second WiFi unit in a service layer of the system; and when both the first WiFi unit and the second WiFi unit stop working, turning off the service module.

\* \* \* \* \*